United States Patent
Koide et al.

(10) Patent No.: US 6,874,563 B2
(45) Date of Patent: Apr. 5, 2005

(54) COMPOSITE METAL PRODUCT OF CARBON NANO MATERIAL AND LOW MELTING POINT METAL AND METHOD OF PRODUCING THE SAME

(75) Inventors: Atsushi Koide, Nagano-ken (JP); Kiyoto Takizawa, Nagano-ken (JP); Yoshitoshi Yamagiwa, Nagano-ken (JP); Masashi Suganuma, Nagano-ken (JP); Mamoru Miyagawa, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 0 days.

(21) Appl. No.: 10/645,347

(22) Filed: Aug. 21, 2003

(65) Prior Publication Data

US 2004/0035548 A1 Feb. 26, 2004

(30) Foreign Application Priority Data

Aug. 22, 2002 (JP) ........................................ 2002-242277

(51) Int. Cl.$^7$ ................................................ B22D 19/00
(52) U.S. Cl. .......................................... 164/97; 164/98
(58) Field of Search ..................... 164/97, 98; 428/408, 428/304.4

(56) References Cited

U.S. PATENT DOCUMENTS

| 5,667,742 A | * | 9/1997 | Dwivedi et al. ............ 264/658 |
| 6,533,447 B2 | * | 3/2003 | Koide et al. .................. 366/78 |
| 6,649,265 B1 | * | 11/2003 | Kawamura et al. ......... 428/408 |

* cited by examiner

Primary Examiner—Kiley S. Stoner
Assistant Examiner—I. H. Lin
(74) Attorney, Agent, or Firm—Weingarten, Schurgin, Gagnebin & Lebovici LLP

(57) ABSTRACT

A carbon nano material and a resin binder are plasticized and injection molded to form a preliminarily molded member. The preliminarily molded member is degreased by a heat treatment and made to a preliminarily molded porous member composed of the carbon nano material. The preliminarily molded porous member is inserted into a cavity of a product mold. A molten low melting point metal is injected into and fills the cavity. The preliminarily molded porous member is impregnated with the low melting point metal by injection pressure, thereby a composite metal product composed of the low melting point metal material integrally composited with the carbon nano material is molded. With the above arrangement, the characteristics of the carbon nano material are applied to the composite metal product to improve the functions thereof.

4 Claims, 2 Drawing Sheets

COMPOSITE METAL PRODUCT OF CARBON NANO MATERIAL AND LOW MELTING POINT METAL AND METHOD OF PRODUCING THE SAME

BACKGROUND OF THE INVENTION

1. Field of the Invention

The present invention relates to a composite metal product made by compositing a carbon nano material with a low melting point metal material by injection molding and to a method of producing the same.

2. Description of the Related Art

A carbon nano material, which is a kind of crystalline carbon materials, has such characteristics that its heat conductivity is about five times or more as high as that of aluminum (Al), magnesium (Mg) and the like, it is excellent in electric conductivity, and it is also excellent in slidability because it has a low friction factor. Since the carbon nano material is very minute, however, it is said that the material is preferably used by being composited with other material.

In a conventional method, a composite material is obtained by mixing the carbon nano material and metal powder, pressing and pulverizing said mixture so that the particle size is from 5 μm to 1 nm, and a composite product is obtained by hot pressing the composite material. In the above method, the composite material is easily oxidizable because the metal is used in the form of fine powder, and, in particular, the compositing method for preparing the composite material has a problem in that it is difficult to apply the method to metals such as magnesium and the like because if they are used in the form of fine powder, they may be broken into a spontaneous flame by oxidization.

The composite material particles must be pressed and molded in an inert gas atmosphere at a low temperature of 0° C. or less and also must be placed in the inert gas atmosphere when it is molded by the hot press, and further there is a limitation in the product of the composite materials that can be manufactured by the hot press molding. Accordingly, a problem arises in that metal products of electronic equipments such as heat sinks, shields and bearings and the like, which are difficult to be molded by a press from the composite material containing the crystalline carbon material.

SUMMARY OF THE INVENTION

An object of the present invention, which has been devised to solve the above problems of the prior art, is to provide a novel composite product and a method of molding the same capable of improving functions required to the parts of electronic equipment such as high heat conductivity, excellent electric conductivity, excellent slidability, and the like by applying the characteristics of a carbon nano material to a composite metal product by compositing a preliminarily molded member, which is made by molding the carbon nano material by applying injection molding thereto, with a low melting point metal material in a molten state that is injected into and filling the carbon nano material.

A composite metal product of the present invention for achieving the above object comprises a preliminarily molded porous member of a carbon nano material and a low melting point metal and the preliminarily molded porous member is impregnated with the low melting point metal in a molten state to thereby form the composite metal product. The low melting point metal comprises at least one selected from the group consisting of metals, alloys of magnesium (Mg), tin (Sn), aluminum (Al), copper (Cu), lead (Pb), and zinc (Zn).

A method of molding a composite metal product according to the present invention comprises the steps of injection molding a carbon nano material and a plasticized resin binder to form a preliminarily molded member, degreasing the preliminarily molded member by heat treatment and forming a preliminarily molded porous member comprising a carbon nano material, inserting the preliminarily molded porous member into a cavity of a mold, injecting a molten low melting point metal into the cavity, impregnating the preliminarily molded porous member with the low melting point metal material by injection pressure, and obtaining the composite metal product comprising the low melting point metal and the carbon nano material integrally composited with.

Further, the preliminarily molded member is injection molded by a screw type preplasticization injection machine comprising a plasticizing device for plasticizing the carbon nano material and a resin binder and a injection device for injecting the plasticized carbon nano material, the plasticizing device and the injection device being disposed separately, both the devices are communicated with each other through a flow path, and the plasticized carbon nano material is injected after metering by the injection device.

According to the above arrangement, since the carbon nano material is composited with the low melting point metal by melting it, it is not necessary to mix the low melting point metal material with the carbon nano material after the metal material is pulverized. Thus, low melting point metals such as magnesium and the like can be safely composited with the carbon nano material because materials having a large particle size such as pellets, chips, and the like can be used as the low melting point metal.

Further, since the composite metal product is completed by injection molding the low melting point metal material and the plasticed resin binder, the product has a high molding accuracy and the product is not limited in its shape and size different from a product formed by press. Therefore, it is possible to easily mold a composite metal product having functions of high heat conductivity, excellent electric conductivity, low friction factor, and the like.

DESCRIPTION OF THE PREFERRED EMBODIMENTS

Figure 1:
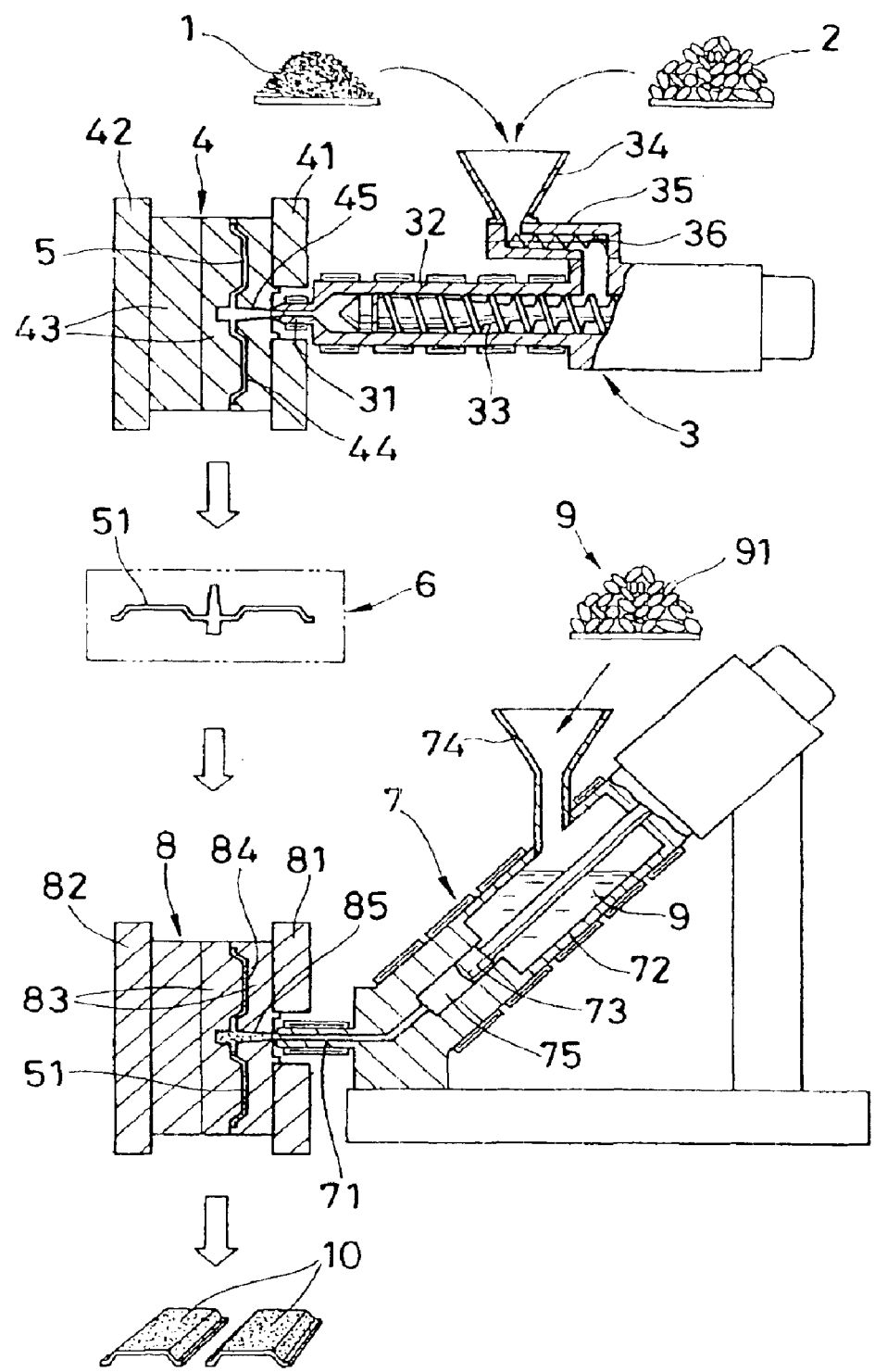
FIG. 1 is a process view of a method of molding a composite metal product composed of a carbon nano material and a low melting point metal according to the present invention.

First, after a carbon nano material 1, which is known as a carbon nano tube and the like, and resin binder pellets 2 such as those of a thermoplastic resin, are plasticized by an inline screw type injection machine 3, they are injected into and fill a mold 4 for preliminarily molding to thereby mold a preliminarily molded member 5 for product as shown in FIG. 1. There can be obtained a carbon nano tube having a diameter of 10 nm (0.01 μm) and a length of 1 to 10 μm as a commercially available carbon nano tube.

The injection machine 3 has an injection screw 33 with a check valve which is disposed in a heating cylinder 32 having a nozzle 31 at the head thereof and rotates and moves forward and rearward therein. Further, the injection molding machine 3 has a material supply unit 35 with a hopper 34 mounted on a material supply port formed on the heating cylinder 32 at a rear portion thereof. A screw conveyer 36 is disposed in the cylinder of the material supply unit 35, and an amount of a material to be supplied can be controlled by controlling the number of rotation of the screw conveyer 36.

The carbon nano material 1 and the resin binder 2, which are supplied from the hopper 34 into the heating cylinder 32, are plasticized (melted and kneaded) by the rotation of the injection screw 33, fed by pressure to the head of the injection screw 33 and metered (stored) in the head portion of the heating cylinder 32 when the injection screw 33 is moved rearward by internal pressure. Then, the carbon nano material 1 and the binder 2 are injected into the mold 4 for preliminarily molding by the forward movement of the injection screw 33 and fill the mold 4 with a plasticized material.

The mold 4 for preliminarily molding is composed of a pair of open/close divided molds 43 attached to a stationary platen 41 and a movable platen 42 of a not shown mold clamping unit and has cavities 44 for forming two sets of products in the interior thereof and a sprue 45 which is located at the center of both the cavities 44 and against which the nozzle 31 is abutted. The plasticized materials injected from the nozzle 31 fill both the cavities 44 through the sprue 45 and are cooled therein so that the preliminarily molded member 5 composed of the carbon nano material 1 and the binder 2 is formed.

After the preliminarily molded member 5 is molded, it is taken out from the divided molds 43 and after transferred to a degreasing unit 6, heated therein to a temperature higher than the melting temperature of the resin binder in an inert gas atmosphere. With the above operation, the resin binder is melted to flow out of and degreased from the preliminarily molded member 5, thereby the preliminarily molded member 5 is made to a preliminarily molded porous member 51 which is composed of the carbon nano material 1 and in which the traces of the lost resin binder remain as voids.

Next, the preliminarily molded porous member 51 is inserted into a product mold 8 provided with a metal injection molding machine 7. Then, a low melting point metal material 9, which comprises at least one selected from the group consisting of metals, alloys of magnesium (Mg), tin (Sn), aluminum (Al), copper (Cu), lead (Pb), and zinc (Zn), is melted and injected into the product mold 8 to fill its cavities, thereby a composite metal product 10 is obtained. An example of the low melting point metal material to be used is a magnesium-based alloy. The composite metal product 10 is composed of the preliminarily molded porous member 51 composed of the carbon nano material integrated with the low melting point metal material 9.

The metal injection molding machine 7 is composed of an inclining melting cylinder 72 having a nozzle 71 at the head thereof and an injection plunger 73 which is disposed in the inclining melting cylinder 72 and moves forward and rearward therein. Further, the metal injection molding machine 7 has a hopper 74 disposed to a supply port formed on the inclining melting cylinder 72 at a rear portion thereof. The low melting point metal 9, which is composed of a granulated material 91 formed as pellets, chips, or the like can be dropped and supplied into the interior of the inclining melting cylinder 72 from the hopper 74. Note that it is preferable that the inside space of the inclining melting cylinder 72 be filled with an inert gas to prevent oxidation.

The granulated material 91 dropped from the hopper 74 into the inclining melting cylinder 72 is melted into the molten metal supplied thereinto previously, is stored in a metering chamber 75 at the head of the melting cylinder 72 each time the injection plunger 73 moves rearward, then extruded by the forward movement of the injection plunger 73, and injected from the nozzle 71 into the product mold 8 and fills the same.

The product mold 8 is composed of a pair of open/close divided molds 83 attached to a stationary platen 81 and a movable platen 82 of a not shown mold clamping unit and has cavities 84 in the interior thereof for forming two sets of product patterns and a sprue 85 which is located at the center of both the cavities 84 and against which the nozzle 71 is abutted. The low melting point metal material 9 injected from the nozzle 71 in the molten state fills both the cavities 84 in which the preliminarily molded porous member 51 was previously inserted, and the voids formed of the carbon nano material in the preliminarily molded porous member 51 is filled with the low melting point metal material 9 by the injection pressure when the metal material 9 is injected, thereby the preliminarily molded porous member 51 is impregnated with the low melting point metal. The composite metal product 10 is made of the carbon nano material 1 integrated with the low melting point metal 9.

Although the preliminarily molded member 5 is injection molded by employing the inline screw type injection machine 3 in the above embodiment, molding efficiency can be improved by employing an injection molding machine similar to a screw type preplasticization injection machine that is used to mold a resin.

Figure 2:
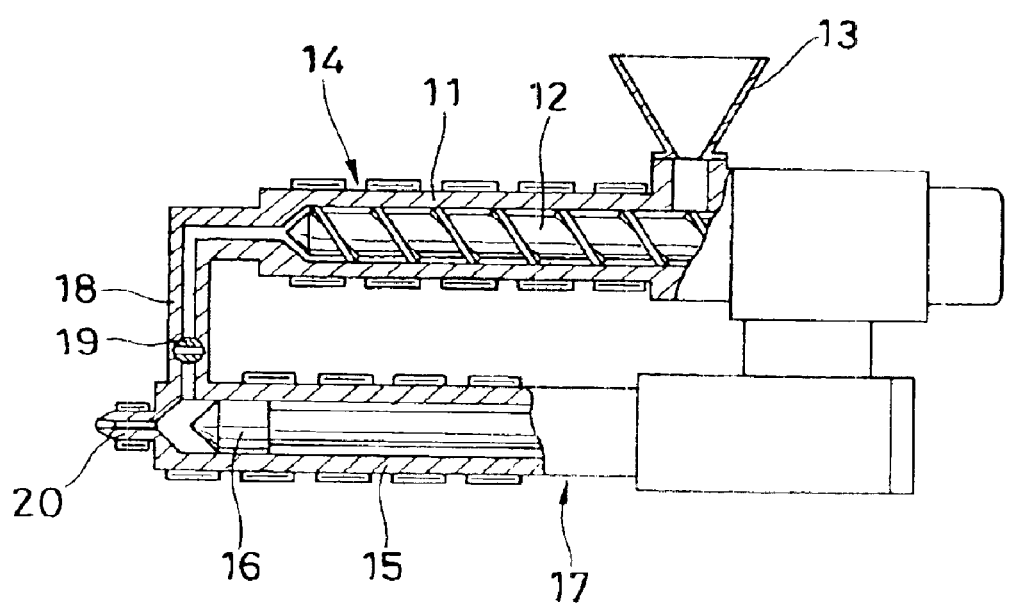
FIG. 2 is a schematic longitudinal sectional view of a screw type preplasticization injection machine for use in the molding method of the present invention.

As shown in FIG. 2, a screw type preplasticization injection machine ordinarily constructed includes a plasticizing device 14 and an injection device 17 disposed in parallel with each other, and a flow path 18 having an open/close valve 19 is disposed between the head of the plasticizing device 14 and the injection device 17 so that the plasticizing device 14 communicates with the injection device 17 through the flow path 18. The plasticizing device 14 has a plasticizing cylinder 11 having a plasticizing screw 12 disposed therein and a hopper 13 disposed on the cylinder 11 at the rear portion thereof, and the injection device 17 has an injection cylinder 15 having an injection plunger 16 forward/rearward movably disposed therein.

Accordingly, in the molding process of the preliminarily molded member 5, the carbon nano material 1 and binder 2 are plasticized (melted and kneaded) by the plasticizing device 14 and fed into the front portion of the injection cylinder 15 under pressure and metered therein. The open/close valve 19 of the flow path 18 is closed after the nano material 1 and the binder 2 are metered, and they are injected from a nozzle 20 into the product mold 8 as the injection plunger 16 moves forward and fill the product mold 8. Before the injecting and filling operation does not finish in the injection device 17, the plasticizing device 14 may start to melt and knead the carbon nano material 1 and the binder 2 supplied thereinto. Accordingly, the screw type preplasticization injection machine above can more effectively produce the preliminarily molded member 5 than the inline screw type injection machine which executes both plasticization and injection in the same machine.

It should be, however, noted that, while omitted in the figure, the composite metal product 10 can be obtained with molding by melting and injecting the low melting point metal 9 using an inline screw type injection machine and a die cast machine that are ordinarily constructed, in addition to the illustrated metal injection molding machine.

What is claimed is:

1. A method of producing a composite metal product, comprising the step of:

injection molding a carbon nano material consisting of a carbon nano tube and a plasticized resin binder to form a preliminarily molded member shaped for a product;

degreasing the preliminarily molded member by heat treatment and forming a preliminarily molded porous member comprising the carbon nano material;

inserting the preliminarily molded porous member into a cavity of a mold shaped for the product;

injecting a molten low melting point metal material into the cavity;

impregnating the preliminarily molded porous member with the low melting point metal material by injection pressure; and obtaining the composite metal product comprising the low melting point metal material and the carbon nano material integrally composited with.

2. The method according to claim 1, wherein the preliminarily molded member is injection molded by a screw type preplasticization injection machine comprising a plasticizing device for plasticizing the carbon nano material and the resin binder and a injection device for injecting the plasticized material, the plasticizing device and the injection device being disposed separately, both the devices are communicated with each other through a flow path, and the plasticized material is injected after metering by the injection device.

3. The method according to claim 1, wherein the low melting point metal is a metal or alloys of the metal selected from the group consisting of magnesium (Mg), tin (Sn), aluminum (Al), copper (Cu), lead (Pb), and zinc (Zn).

4. The method according to claim 2, wherein the low melting point metal is a metal or alloys of the metal selected from the group consisting of magnesium (Mg), tin (Sn), aluminum (Al), copper (Cu), lead (Pb), and zinc (Zn).

* * * * *